Dec. 31, 1940.  C. L. EKSERGIAN  2,226,557
ANTIWHEEL SLIDE DEVICE
Filed May 31, 1939
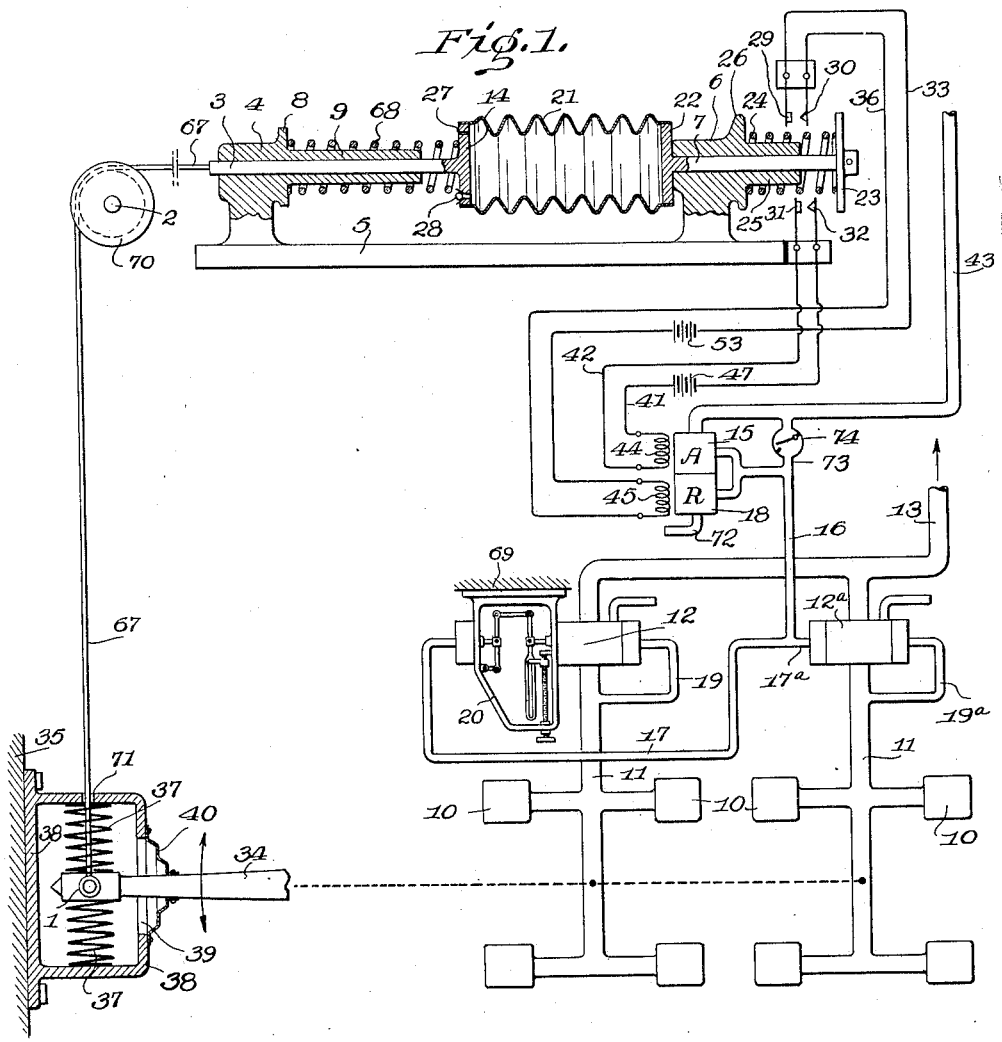
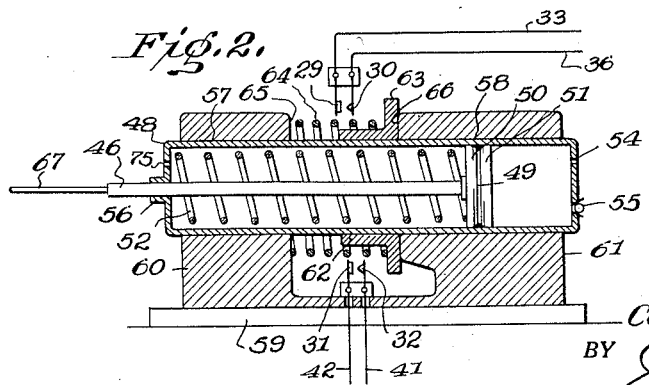
INVENTOR:
Carolus L. Eksergian
BY John P. Jackup
ATTORNEY Patented Dec. 31, 1940

2,226,557

UNITED STATES PATENT OFFICE 2,226,557

ANTIWHEEL SLIDE DEVICE

Carolus L. Eksergian, Detroit, Mich., assignor to Budd Wheel Company, Philadelphia, Pa., a corporation of Pennsylvania Application May 31, 1939, Serial No. 276,576

9 Claims. (Cl. 303—21)

The present invention relates to means for preventing wheel slide when brakes are applied to vehicle wheels.

More specifically, the invention relates to vehicles, such as railway rolling stock or heavy trucks, buses, and the like, wherein air brakes are generally used, the purpose of the invention being to prevent the wheels of the vehicle from slipping on the track or on the road, as the case may be, when the braking effort is excessive.

The invention is applicable especially in connection with brake mechanism which has a torque arm that moves in response to the braking torque, particularly brakes having a torque arm of the type disclosed in co-pending application Serial No. 198,398.

When the free end of the torque arm in a brake of this type is provided with means of suitable kind to provide an increasing resistance to its motion, such as a spring or springs of definite strength or the like, the said yieldable means will be actuated suddenly when the torque drops rapidly, as happens when the wheels slide or are about to slide, and therefore the present invention provides means correlated with the said torque arm and so arranged that a sudden shift of the free end of the torque arm, in the direction corresponding to decreasing torque, will actuate appropriate control mechanism associated with the brakes, while a rapid movement of the torque arm in the other direction or a slow movement of the torque arm in either direction, such as would be produced by normal variations of the braking torque, will leave the said control mechanism unaffected.

Thereby when a sudden drop in the torque occurs, correcting means will be actuated to release the brakes, wholly or partially, until the wheels no longer slide or tend to slide, whereupon the normal braking action is resumed automatically.

The above results may be accomplished in various ways, but in a preferred form of the invention electrical switches are provided which cooperate with the mechanism actuated by the torque arm, so as to control the brake action and, furthermore, manual control of the braking action may also be provided for emergency use in case the electrical system fails in any way.

Two forms illustrative of the invention are described herein and disclosed in the accompanying drawing, forming a part hereof.

In said drawing:

Fig. 1 is a diagrammatic representation of one device embodying the invention, certain parts being shown in longitudinal section.

Fig. 2 is a fragmentary view of a modified form.

Referring first to Fig. 1, the brake cylinders 10 are shown connected through the branch pipes 11 with the main conduit 13. It will be understood that preferably these brakes are of the general type disclosed in application Serial No. 198,398. The torque arm 34, only the extreme or "free" end of which is shown here, enters a protective casing 38 which may be suitably secured to any relatively stationary part of the vehicle, here designated by 35. The casing 38 has an opening 39 of ample size to permit the necessary range of movement of the free end of the torque arm 34 in an up or down direction, as indicated by the double pointed arrow. A sealing membrane or diaphragm 40, having suitable flexibility, covers the opening 39 and engages the torque arm 34, in order to prevent the entrance of water, dirt or other foreign matter into the casing 38, so that the mechanism enclosed therein will not be affected by such foreign matter.

Two springs 37 of suitable known strength may be arranged in the casing 38, so as to bear upon both sides of the free end of the torque arm 34 and maintain it normally in the neutral or central position indicated in the diagram. A flexible element such as a cord, wire, cable, chain, or the like indicated at 67 is secured to the end of the torque arm as shown at 1 and passes out through an opening 71 in the casing 38, and thence over the pulley 70 pivoted at 2.

This tension member 67 is secured to the rod 3, slidably mounted in the bearing 4 which forms part of, or is secured to, any suitable base 5. The base 5 carries at its other end another bearing member 6 wherein slides a second rod 7. The bearing member 4 may have a flat flange thereon as shown at 8, and also a tubular extension 9 surrounding the rod 3. A flange or disk 14 is secured in any suitable way to the other end of the rod 3, and a spring 68 bears against the flanges 8 and 14, so as to urge them apart, this spring being of sufficient internal diameter to slip easily over the tubular extension 9, which thus serves as a guide for both the rod 3 and the spring 68, to assure smoothness of motion.

A flexible but gas-tight bellows member 21 is secured at one end of the peripheral surface of the disk or flange 14 and the other end of the bellows is similarly secured to another disk or flange 22 mounted upon one end of a rod 7. The rod 7 also carries an additional disk 23 at its other end, and a spring 24 surrounds the rod, as well as a tubular extension 25 of the bearing 6, so that it will urge the disk 23 away from the flange 26 on the bearing member 6. The disk 22 is solid, that is, free from any openings, but a suitable small vent 27 is preferably provided in the disk 14 to allow slow passage of air into and out of the bellows 21, and a check valve 28 is also provided in the said disk, this check valve allowing air to escape from the the bellows but preventing any return thereof.

The disk 23 is of suitable diameter to project beyond the outside diameter of the spring 24 so that it may actuate electrical contacts arranged in proximity to such spring and disk, as indicated at 29 and 30 above the spring, and at 31 and 32 below the spring, respectively. These contacts serve to control relay windings 44 and 45, the contacts 29 and 30 being connected to the coil 45 through the conductors 33 and 36, and a battery or other source of energy 53 being inserted in the conductor 33 so that whenever the disk 23 causes contacts 29 and 30 to engage one another a current will be established through the coil 45.

Similarly, the contacts 31 and 32 are connected to the winding 44 by the conductors 41 and 42 respectively, a suitable source of energy 47 being arranged in the conductor 41 so that when contacts 31 and 32 are brought into engagement with one another by the disk 23 a current will be established in the winding 44.

It will be understood that the element 15 is an application valve which is normally open and when actuated will shut off the air pressure from pipe 43, which is under the control of the operator, to the brakes, whereas the device 18 is the release valve, which will release the air pressure through the relay valves 12 and 12a on the brake cylinders 10 by connected pipe 16 to exhaust 72. The aggregate of elements 15, 18, 44 and 45 thus constitutes an electrically operable relay for controlling the brake valves through the line 16.

A by-pass 73 connects the pipe 16 with the air pipe 43, and a check valve 74 preferably is provided therein and so arranged that while air can flow from 16 into 43 through the check valve, flow in the opposite direction will be prevented by the said valve. The pipe 16 will supply air to the branch pipes 17 and 17a which latter will feed the relay valves, 12 and 12a respectively, which are connected by the short pipes or lines 19 and 19a to the conduits 11 leading to the brake cylinders 10.

The relay 12a may be of the conventional type while the relay 12 preferably may have cooperating therewith an infinitely variable type of connection 28, 69 such as is disclosed for example in Fig. 4 of copending application Serial No. 271,081, or in certain other figures of said copending case. This difference in the relays 12 and 12a makes it possible to control one set of brakes differently from the other, that is, to produce a greater braking effect by one or the other as may be expedient in practice and further details of this feature are given in the copending case above referred to.

Referring now to Figure 2 of the present case it will be understood that many of the elements are or may be exactly the same as those in Fig. 1 and these parts have been in large part omitted and where shown are all designated by the same reference characters in the two figures so that it is unnecessary again to describe them.

The difference between the two forms of apparatus disclosed in the present specification resides in the type of contact controlling mechanism used. In Fig. 2 the flexible member 67 is connected to a rod 46 which extends into the cylinder 48 and terminates in a piston 49, shown as consisting of two cupped washers 50 and 51 of more or less conventional type cooperating with the bore of the cylinder 48. A spring 52 arranged around the rod 46 and within the cylinder is under compression and urges the piston to the right, and conversely urges the cylinder 48 to the left, as shown. A small vent 54, formed in the right hand end of the cylinder 48, permits slow passages of air or other gas in either direction, while a check valve 55 is also provided to allow air to escape from the cylinder 48 but to prevent its reentry.

The cylinder 48 may have a loosely fitting guide 56 for the rod 46 to permit leakages of air to and from its left hand end for the same purpose and may also have a port 75 in said end for the same purpose, the other end of the rod being suitably guided within the cylinder by the piston. A bore 57 and another bore 58 in alignment therewith, may be formed in the bifurcated member 59 which has the left bearing arm 60 and the right bearing arm 61 wherein said bores are formed.

A tubular member or ring 62 may engage the outside of the cylinder 48 firmly or even may be secured thereto rigidly in any desired manner, and this tubular member carries an annular flange 63 which extends somewhat beyond the outer diameter of the spring 64. This spring, which is under compression, passes over the tubular member 62 and bears at one end against a surface of the flange 63, in turn forcing the other surface of the flange 63 against the end 66 of the arm 61 while the other end of the spring 64 bears against the end 65 of the arm 60.

In operation, referring first to the Fig. 1 form, when the torque arm 34 moves slowly up or down, under the control of the braking effort and controlled also by the springs 37—37, the movement of the free end of said arm will be communicated through the tension member 67 to the rod 3 and thereby the bellows 21 will be slowly extended due to pull on 67 or collapsed by the spring 68 as the case may be, since the air contained within the bellows may escape readily through the vent 27 or conversely outside air may enter so that in either case when the motion of the torque arm is relatively slow and small, the sole effect will be a corresponding extension or compression of the bellows member.

A sudden upward movement of the free end of the torque arm 34, which corresponds to a rapid increase of braking effort, will release the tension member 67 and thereupon the spring 68 will tend to collapse the bellows, the air contained in said bellows escaping rapidly through the check valve 28, which opens outwardly, in addition to escaping through the small vent 27, so that in this case again no effect will be produced other than a more or less sudden collapse of the bellows.

On the contrary, should the free end of the torque arm 34 descend suddenly, which corresponds to a sudden drop in the braking torque, such as would occur when the wheels slide or are about to slide on the track or on the roadway, due to the greatly diminished sliding friction as compared with the static friction existing when no slippage occurs the tension member 67 will attempt to expand or distend the bellows suddenly. However, due to the relative smallness of the vent 27, it will be impossible for the outer air to enter the bellows rapidly enough to permit this action to occur and, of course, the check valve 28 which opens only outwardly will not allow any additional air to enter the bellows. The result, therefore, is that the bellows will not be capable of sudden inflation or extension of its length and, therefore, the sudden pull of the tensile member 67 will move the bellows 21 as a whole to the left from the position shown in Fig. 1. This will cause the rod 7 secured to the right hand end of the bellows to move to the left and to carry along with it the disk 23.

The disk 23, upon moving to the left from the position shown in Fig. 1 will first encounter the contact 32 and move it into electrical connection with the contact 31, thus actuating the relay winding 44 and causing the application valve A to discontinue supplying pressure to the line 16. This happens relatively quickly and upon further motion of the disk 23 in the same direction said disk will next bring contact 30 into electrical connection with contact 29, thus energizing the relay coil 45 in its turn and thereby operating the relief valve R to release the pressure in the line 16, thus releasing the pressure on the brakes. This release of pressure will reduce the braking torque and stop the wheel slide.

Shortly after this actuation of the disk 23 the spring 24 will return it to its initial position by causing air to enter into the bellows 21 through the vent 27, whereupon the apparatus will be in condition to repeat its operation whenever necessary.

The next operation of the free end of the torque arm 34 will presumably be a gradual or sudden upward movement thereof as the normal braking is again resumed, which also will help to restore the bellows 21 to its normal condition, with the assistance of the spring 68.

In case the control valves A, R fail to operate properly, the upwardly opening check valve 74, in line 73, may also serve to release the pressure from the line 16 if the operator at the same time reduces the pressure in the control line 43.

Referring now to the form of device illustrated in Fig. 2, it will be noted that this form is practically identical with the Fig. 1 form in all respects except for the structure of the mechanism controlled by the tension transmitting member 67, which mechanism here comprises a cylinder and piston in place of the bellows device of Fig. 1.

A downward pull on the tensile member 67 will pull the rod 46 and the piston 49 connected thereto toward the left from the position shown in Fig. 2 and will thus compress the air or gas contained in cylinder 48, to the left of the piston, which however will escape through the port 75. However, the check valve 55 opens outwardly so that when the piston moves to the left the air in the cylinder to the right of the piston will become correspondingly rarefied except to the extent that outside air may leak in through the small vent 54 to equalize external and internal pressures.

Thus a slow downward movement of the tensile member 67 will permit such equalization of pressures to occur, whereas a sudden pull will cause the piston to move too rapidly to permit prompt equalization of pressures, and therefore a greater effort will be exerted on the cylinder by a sudden movement of the tension transmitting element 67 than by a gradual movement of the latter, because in the case of a sudden movement the outer air pressure will assist in forcing the cylinder 48 to the left, because of the vacuum produced in the right hand end of the cylinder. This total force will suffice to overcome the force of the spring 64 so that the member 62, having the flange 63, will move to the left and successively close first the contacts 32 and 31 and thereupon the contacts 30 and 29, whereupon the same action is produced on the control valves A, R as in the Fig. 1 form.

This sudden pull on the tensile member 67, of course, will occur when the free end of the torque arm 34 moves downward due to sudden failure or partial failure of braking torque when the wheels slide or are about to slide, just as in the previously described form of the device.

However, should the free end of the torque arm 34 move down slowly due to a gradually decreasing torque, such as would be produced in a normal stop, the air vent 54 will pevent the formation of a vacuum in the right hand end of the cylinder 48 and consequently the pneumatic forces acting on the cylinder will not suffice to overcome the power of the spring 64 so that no actuation of the electrical contacts will take place.

Even when the torque arm 34 has moved down suddenly, the cylinder will, of course, gradually resume the position shown in Fig. 2 as soon as sufficient air has leaked in through the vent 54 to overcome the additional atmospheric pressure first produced due to the partial vacuum.

When the torque arm 34 moves upwardly, of course, no actuation of the contacts takes place because the piston will move to the right and air compression will occur in the right hand end of the cylinder 48 but this compression if slow will leak out with sufficient rapidity through the vent 54 and if sudden will leak out additionally through the check valve 55, so that no excessive force can exist in this end of the cylinder due to compression of the air, whether the piston moves rapidly or slowly.

All the remaining parts of the system illustrated in Fig. 2 will, of course, operate exactly the same as they do in Fig. 1 and in fact the two embodiments of the invention are identical with the exception of the bellows structure of Fig. 1 and the cylinder and piston structure replacing it in Fig. 2, both of which accomplish the same general function in more or less the same way in principle.

Having described two preferred forms which the invention may take, it must be clearly understood that many other forms are possible and that the two forms selected for illustration are intended merely to explain the invention and not in any way to limit the scope thereof. The invention itself is defined only by the following.

What I claim is:

1. Means for preventing wheel slide comprising a brake having a torque arm, yieldable means cooperating with said torque arm to cause its motion to be dependent upon the torque of the brake, and means operated by said torque arm to control the braking force, said means comprising an air compressing device including a check valve and a small vent, and which responds to rapid motion of the torque arm in one direction but is relatively unaffected by sudden motion of the torque arm in the other direction or by slow motion of the arm in either direction.

2. Means for preventing wheel slide comprising a brake having a torque arm, yieldable means cooperating with said torque arm to cause its motion to be dependent upon the torque of the brake, and control means operated by said torque arm to control the braking force, said means comprising a pneumatic device which responds to rapid motion of the torque arm in one direction by producing a pressure difference, but has pressure relief means for preventing such pressure difference from being built up by sudden motion of the torque arm in the other direction or by slow motion of the arm in either direction.

3. Means for preventing wheel slide comprising a brake having a torque arm, spring means cooperating with said torque arm to cause its motion to be dependent upon the torque of the brake, control means, including a movable element, a motion-transmitting member operatively connecting said arm to said movable element, said control means comprising a pneumatic device having a gas chamber the volume of which is controlled by said movable element and which responds to rapid motion of the torque arm in one direction by varying the volume of the contained gas and thus producing a pressure difference, but which has a gas release means for preventing such pressure difference from being built up by sudden motion of the torque arm in the other direction, and an electric circuit closer controlled by said control means.

4. Means for preventing wheel slide comprising an air brake having a torque arm, yieldable means cooperating with said torque arm to cause its motion to be dependent upon the torque of the brake, control means operated by said torque arm to control the braking force, said means comprising a pneumatic device which responds to rapid motion of the torque arm in one direction by producing a pressure difference, but has means for preventing such pressure difference from being built up by sudden motion of the torque arm in the other direction or by slow motion of the arm in either direction, an electric circuit, cooperating contacts therein, means mechanically actuated by the pneumatic device for operating said contacts, and an electrically-operable air valve connected to said circuit for controlling the brake.

5. Means for preventing wheel slide comprising a brake having a torque arm, spring means cooperating with said torque arm to cause its motion to be dependent upon the torque of the brake, control means, a motion-transmitting member operatively connecting said arm to said control means, said control means comprising a pneumatic device having a cylinder and piston providing a gas chamber of variable volume which responds to rapid motion of the torque arm in one direction by varying the volume of the contained gas and thus producing a pressure difference, but which has a gas release valve for preventing such pressure difference from being built up by sudden motion of the torque arm in the other direction, a support for the cylinder, said cylinder being slidable in said support, and electric circuit closing means operatively associated therewith and controlled by the sliding of said cylinder in its support.

6. Means for preventing wheel slide comprising a brake having a torque arm, spring means cooperating with said torque arm to cause its motion to be dependent upon the torque of the brake, control means, a motion-transmitting member operatively connecting said arm to said control means, said control means comprising a pneumatic device having a bellows providing a gas chamber of variable volume which responds to rapid motion of the torque arm in one direction by varying the volume of the contained gas and thus producing a pressure difference, but which has a gas release valve for preventing such pressure difference from being built up by sudden motion of the torque arm in the other direction, said gas chamber being movable bodily in response to sufficient pressure difference, and electric circuit controlling means adjacent said chamber and operable upon said bodily movement thereof.

7. Means for preventing wheel slide, comprising a brake having a torque arm, spring means coooperating with said torque arm to cause its motion to be dependent upon the torque of the brake, control means, a motion-transmitting member operatively connecting said arm to said control means, said control means comprising a pneumatic device having a cylinder and piston providing a gas chamber of variable volume which responds to rapid motion of the torque arm in one direction by varying the volume of the contained gas and thus producing a relatively great pressure difference, but which has a check valve for preventing such pressure difference from being built up by sudden motion of the torque arm in the other direction, and which also has a leakage vent of relatively small size, which allows the gas to escape with sufficient speed to prevent relatively slow motion of the piston from building up sufficient pressure difference to actuate the control means, a support for the cylinder, said cylinder being slidable in said support, and electric circuit closing means operatively associated therewith and controlled by the sliding of said cylinder in its support.

8. An anti-wheel slide device for brakes comprising a member movable under the braking torque, yieldable means cooperating with said member causing its motion in either direction to be dependent upon the torque of the brake, means operated by said torque member to control the braking applying force in case of wheel slide, said means comprising a device responsive to rapid motion of the torque member in one direction, due to decrease in torque incident to wheel slide, for reducing the braking force, said means being inoperative to affect the braking force by relatively slow movements of the torque arm in either direction.

9. An anti-wheel slide device according to claim 8 in which the control means comprises an electrically operated valve in the brake control line, the circuit for said electrically operated valve being controlled by the torque member movement.

CAROLUS L. EKSERGIAN.